US012607237B2

(12) United States Patent (10) Patent No.: US 12,607,237 B2
Sugiya et al. (45) Date of Patent: Apr. 21, 2026

(54) CAM CLUTCH

(71) Applicant: TSUBAKIMOTO CHAIN CO., Osaka (JP)

(72) Inventors: Tsubasa Sugiya, Osaka (JP); Eiichi Nakagawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 19/284,933

(22) Filed: Jul. 30, 2025

(65) Prior Publication Data

US 2026/0043441 A1 Feb. 12, 2026

(30) Foreign Application Priority Data

Aug. 8, 2024 (JP) ................................. 2024-131909

(51) Int. Cl.
  *F16D 41/07* (2006.01)
  *F16D 41/08* (2006.01)
  *F16D 41/06* (2006.01)
(52) U.S. Cl.
  CPC ............. *F16D 41/07* (2013.01); *F16D 41/08* (2013.01); *F16D 2041/0603* (2013.01)
(58) Field of Classification Search
  CPC ........ F16D 41/07; F16D 41/08; F16D 41/084; F16D 41/086; F16D 41/088; F16D 2041/0603
  See application file for complete search history.

(56) References Cited

U.S. PATENT DOCUMENTS

2003/0010592 A1* 1/2003 Miura ..................... F16D 41/07
                                                                192/45.1
2022/0056963 A1 2/2022 Nakagawa et al.
2022/0056965 A1* 2/2022 Kunimatsu ........... F16D 41/088

FOREIGN PATENT DOCUMENTS

JP 2020-190255 A 11/2020

* cited by examiner

*Primary Examiner* — Lori Wu
(74) *Attorney, Agent, or Firm* — WHDA, LLP

(57) ABSTRACT

To provide a cam clutch that has a simple configuration and is capable of preventing a cam posture changing portion from being strongly sandwiched between a cam, an outer ring and an inner ring, and of tilting a cam efficiently without causing deformation of the cam posture changing portion and the cam themselves. A cam clutch includes an operation mode switching mechanism, wherein the operation mode switching mechanism includes a cam posture changing portion. A plurality of cams each includes inner and outer ring abutment curved surfaces provided at positions facing an outer peripheral surface of the inner ring and/or an inner peripheral surface of the outer ring, and a lateral abutment surface. The lateral abutment surface is connected to ends of the inner and outer ring abutment curved surfaces, and is formed inside of the cam relative to a virtual extension curved surface.

5 Claims, 8 Drawing Sheets

100

120

110

130

140

100

150    120    121    110    111    143    144    140

130    151    152

131

132    133    134    122    141    142

ENLAGED VIEW OF PORTION A

CAM CLUTCH

BACKGROUND OF THE INVENTION

1. Field of the Invention

The present invention relates to a cam clutch including an inner ring and an outer ring, which are provided coaxially and rotatably relative to each other, a plurality of cams provided in a circumferential direction between the inner ring and the outer ring, and biasing means for biasing the plurality of cams in a radial direction.

2. Description of the Related Art

Conventionally, as a cam clutch having an inner ring and an outer ring, there has been known a cam clutch having an operation mode switching mechanism for switching between a free state in which relative rotational operations of the outer ring and the inner ring are permitted and a locked state in which relative rotational operations of the outer ring and the inner ring are prohibited, as described in, for example, Japanese Patent Application Publication No. 2020-190255.

A cam clutch (100) known in Japanese Patent Application Publication No. 2020-190255 has an inner ring (110) and an outer ring (120) provided coaxially and relatively rotatably, a plurality of cams (131) provided in a circumferential direction between the inner ring (110) and the outer ring (120), biasing means (139) for biasing the plurality of cams (131) in a radial direction, and an operation mode switching mechanism (140).

By rotating the operation mode switching mechanism (140) to bring a cam posture changing portion (142) into abutment with the cam (131), the posture of the cam (131) is changed to change the contact state between the outer ring (120) and the inner ring (110) and the cam (131). Accordingly, the free state in which relative rotational operations of the outer ring (120) and the inner ring (110) are permitted and the locked state in which relative rotational operations of the outer ring (120) and the inner ring (110) are prohibited, can be switched easily.

SUMMARY OF THE INVENTION

However, the cam clutch known in Japanese Patent Application Publication No. 2020-190255 still has room for improvement.

That is, in the cam clutch known in Japanese Patent Application Publication No. 2020-190255, since the surface of the cam with which the cam posture changing portion comes into abutment is a curved surface continuous from the surface where the cam contacts the outer ring and the inner ring, the cam posture changing portion moves so as to enter between the surface of the cam with which one of the outer ring and the inner ring comes into contact, and sandwiches the cam with the other of the outer ring and the inner ring, bringing about a risk of increasing the force required to tilt the cam.

Further, when using a cam cage ring which is interposed between adjacent cams and maintains the postures of the cams, there is a risk that the cam cage ring and the cam posture changing portion sandwich a cam, thereby increasing the force required to tilt the cam.

In addition, there is a risk that the cam posture changing portion and the cam themselves become deformed by sandwiching the cam posture changing portion between the cam and one of the outer ring and the inner ring.

The present invention is to solve these problems, and an object of the present invention is to provide a cam clutch that has a simple configuration and is capable of preventing the cam posture changing portion from being strongly sandwiched between the cam, the outer ring and the inner ring, and of tilting a cam efficiently without causing deformation of the cam posture changing portion and the cam themselves.

A cam clutch of the present invention is a cam clutch including: an inner ring and an outer ring provided coaxially and relatively rotatably; a plurality of cams provided in a circumferential direction between the inner ring and the outer ring; biasing means that bias the plurality of cams in a radial direction; and an operation mode switching mechanism that switches between a free state in which relative rotational operations of the outer ring and the inner ring are permitted, and a locked state in which relative rotational operations of the outer ring and the inner ring are prohibited, wherein the operation mode switching mechanism includes a cam posture changing portion that is provided movably in a circumferential direction, a radial direction, or an axial direction independently of the rotational operations of the inner ring and the outer ring and forces each of the cams to tilt, the cam posture changing portion having a cam abutment portion capable of coming into contact with each of the cams from the circumferential direction, the plurality of cams each including an inner and outer ring abutment curved surface provided at a position facing an outer peripheral surface of the inner ring and/or an inner peripheral surface of the outer ring, and a lateral abutment surface provided at a position facing in a movement direction of the cam abutment portion, and the lateral abutment surface being connected to an end of the inner and outer ring abutment curved surface and formed inside of each of the cams relative to a virtual extension curved surface which is an extension of the inner and outer ring abutment curved surface. Accordingly, the problems described above are solved.

In a cam clutch of an invention according to aspect 1, the cam posture changing portion has a cam abutment portion capable of coming into contact with the cam from the circumferential direction, the plurality of cams have inner and outer ring abutment curved surfaces provided at positions facing an outer peripheral surface of the inner ring and/or an inner peripheral surface of the outer ring, and lateral abutment surfaces provided at positions facing in the movement direction of the cam abutment portion. The lateral abutment surfaces are connected to the ends of the inner and outer ring abutment curved surfaces and are formed inside of the cam relative to a virtual extension curved surface which is an extension of the inner and outer ring abutment curved surfaces. Therefore, when tilting the cam, the cam abutment portion can securely press the lateral abutment surfaces without being guided toward the inner and outer ring abutment curved surfaces, thereby preventing the cam posture changing portion from being strongly sandwiched between the inner and outer ring abutment surface and the inner ring or the outer ring, and thereby preventing deformation of the cam posture changing portion or the cam themselves.

Further, by pressing the lateral abutment surface reliably by the cam abutment portion from the side of the cam, the force for tilting the cam can be efficiently transmitted, and the cam can be easily tilted with a light force.

According to the configuration described in aspect 2, the lateral abutment surface is formed by a plane orthogonal to the movement direction of the cam abutment portion, so that the cam abutment portion can more reliably press the lateral abutment surface to efficiently transmit the force to tilt the cam when tilting the cam.

According to the configuration described in aspect 3, the distance from a connecting point between the lateral abutment surface and the inner and outer ring abutment curved surface to the inner ring or outer ring is equal to or less than a radial thickness of the cam abutment portion of the cam posture changing portion when the cam clutch is assembled, so that the cam abutment portion is prevented from entering between the inner ring or outer ring and the inner and outer ring abutment curved surface and being tightly sandwiched therebetween. Accordingly, the cam abutment portion can reliably press the lateral abutment surface to efficiently and easily tilt the cam.

According to the configuration described in aspect 4, the cam includes a tilt adjustment receiving portion, which is a space provided inside of the cams relative to the virtual extension curved surface, on the opposite side of the lateral abutment surface with the outer ring abutment curved surface interposed therebetween. Thus, when a space where the cam can tilt is limited by a cam cage ring or the like, when tilting the cam, the cam cage ring is received in the tilt adjustment receiving portion, thereby ensuring a movement amount for sufficiently tilting the cam by the cam abutment portion.

According to the configuration described in aspect 5, the cams are each provided with a tilt adjustment protrusion protruding from a side of the lateral abutment surface opposite to a connecting point between the outer ring abutment curved surface and the lateral abutment surface with the lateral abutment surface therebetween. Thus, when a space where the cam can tilt is limited in a cam cage ring or the like, the tilt angle of the cam can be adjusted by bringing a surface of the cam abutment portion into contact with the cam abutment portion at two points of a connecting point of the inner and outer ring abutment curved surface and the lateral abutment surface and the tilt adjustment protrusion when the cam abutment portion pressing the cam crosses over the inner and outer ring abutment curved surface, and it is also possible to, for example, adjust the inner and outer ring abutment curved surfaces in a direction in which the cam tilting portion can cross over and pass through easily.

DESCRIPTION OF THE PREFERRED EMBODIMENTS

Figures 1, 2:
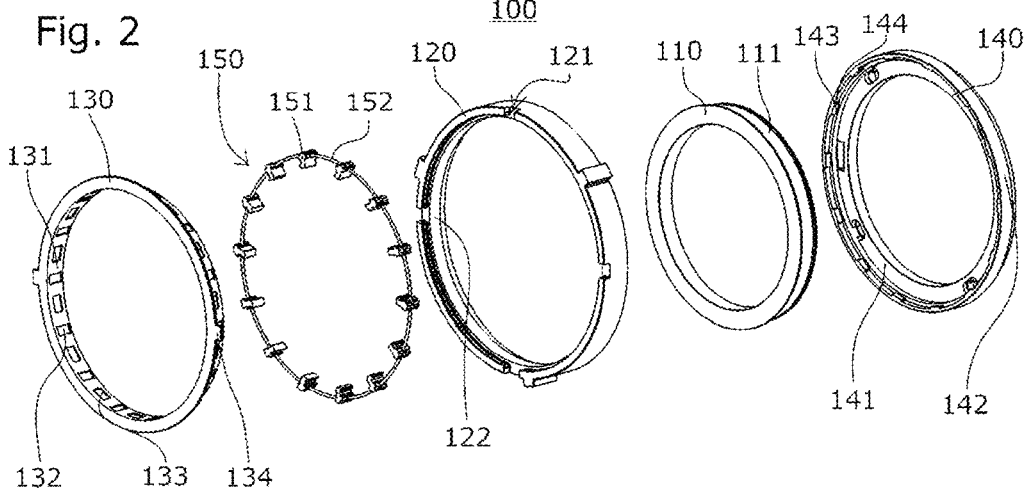
FIG. 1 is a perspective view of a cam clutch 100 according to an embodiment of the present invention.
FIG. 2 is an exploded perspective view of the cam clutch 100 according to an embodiment of the present invention.
Figure 3:
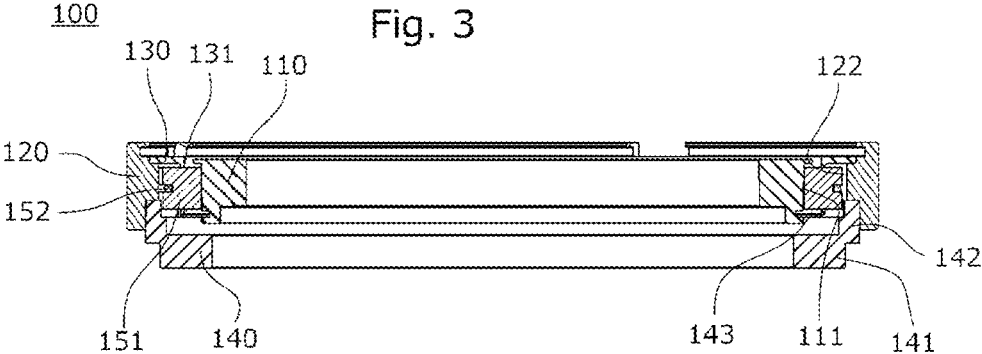
FIG. 3 is a lateral cross-sectional view of the cam clutch 100 according to an embodiment of the present invention.
Figure 4:
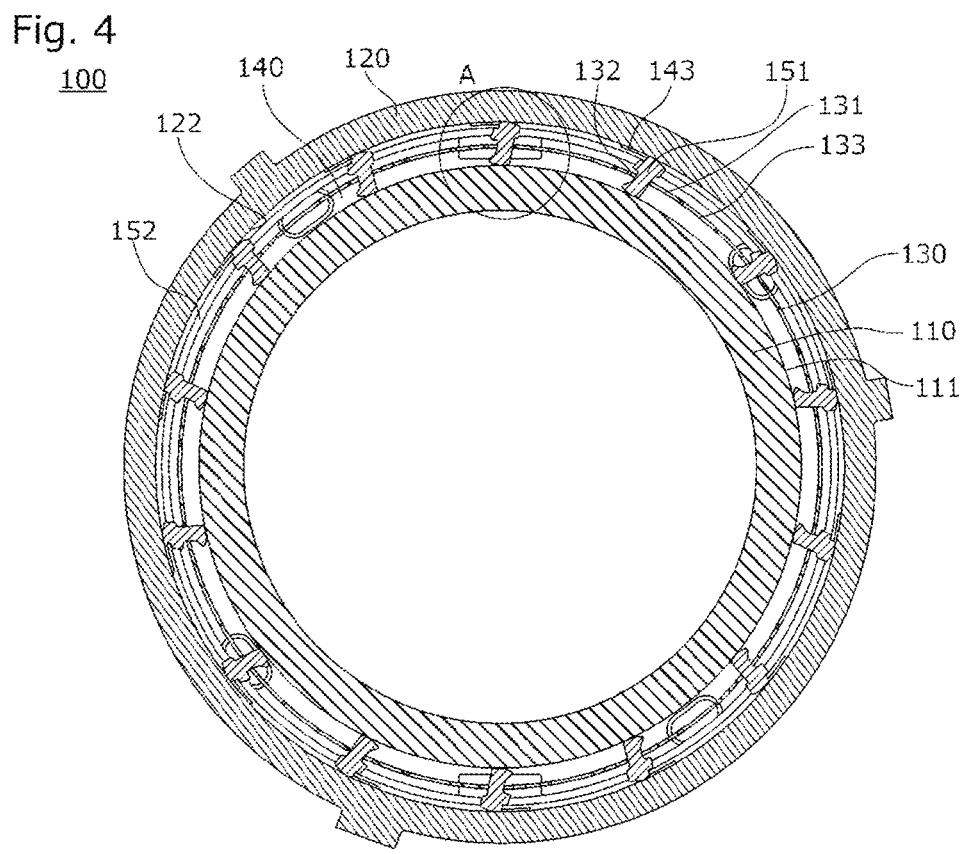
FIG. 4 is a front cross-sectional view of the cam clutch 100 according to an embodiment of the present invention.
Figure 5:
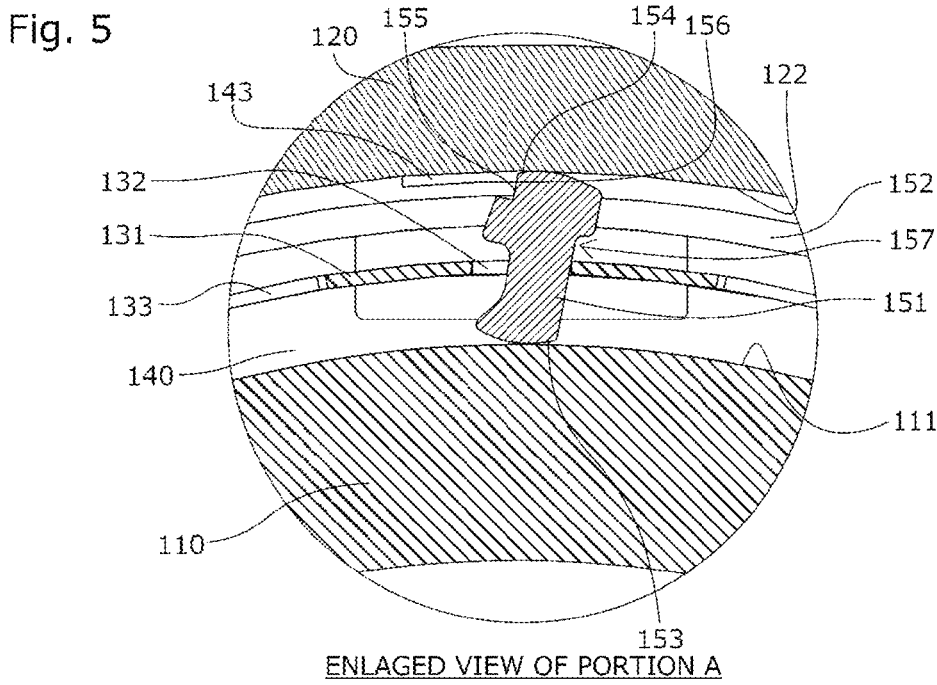
FIG. 5 is an enlarged view of a portion A of the cam clutch 100 according to an embodiment of the present invention.
Figure 6:
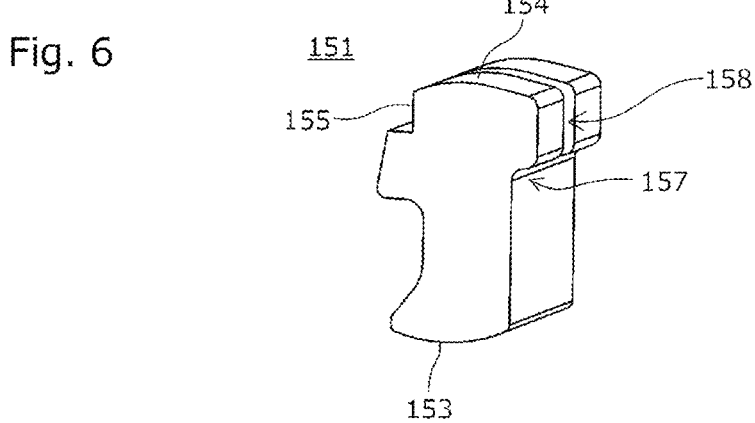
FIG. 6 is a perspective view showing a cam 151 of the cam clutch 100 according to an embodiment of the present invention.
Figure 7:
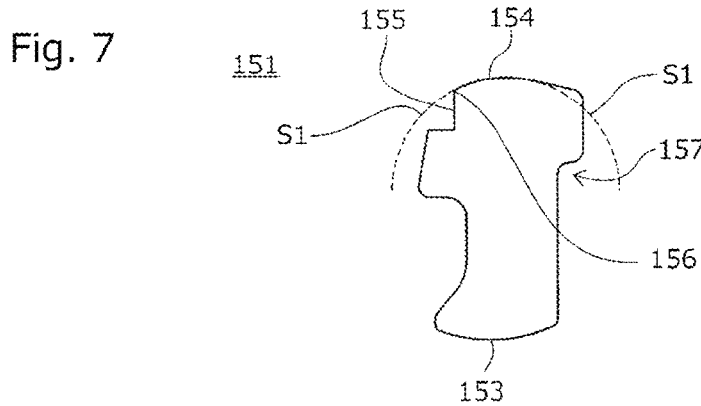
FIG. 7 is a front view showing the cam 151 of the cam clutch 100 according to an embodiment of the present invention.

A cam clutch 100 according to an embodiment of the present invention will now be described hereinafter with reference to the drawings.

For the sake of explanation, rollers are not shown.

As shown in FIGS. 1 to 7, a cam clutch 100 according to an embodiment of the present invention includes an inner ring 110 and an outer ring 120 provided coaxially and relatively rotatably, a cam mechanism 150 provided between the inner ring 110 and the outer ring 120, and a selector ring 140 as an operation mode switching mechanism for tilting a cam 151 of the cam mechanism 150 to switch an operation mode of the cam clutch 100.

The inner ring 110 is formed in an annular shape, and an outer peripheral surface of the inner ring 110 is provided with, over the entire circumference thereof, an inner ring side abutment portion 111 which comes into abutment with an inner ring abutment curved surface 153 of the cam 151 to transmit a driving force.

The outer ring 120 is formed in an annular shape. An inner peripheral surface of the outer ring 120 is provided with, over the entire circumference thereof, an outer ring side abutment portion 122 which comes into abutment with an outer ring abutment curved surface 154 of the cam 151 to transmit a driving force. An engaged portion 121 capable of coming into engagement with an outer peripheral protrusion 134 described later is provided at one end of the outer ring 120 in an axial direction.

A cam cage ring 130 includes a ring body 131 formed in an annular shape, cam housing portions 132 and roller housing portions 133 formed in the ring body 131 so as to be arranged alternately over the entire circumference, and an outer peripheral protrusion 134 formed so as to protrude radially outwardly from one end of the cam cage ring 130 in the axial direction.

The cam housing portion 132 includes a space in which the cam 151, which will be described later, can be tilted by a predetermined amount in a circumferential direction, and a roller housing portion 133 includes a space in which a roller (not shown) can rotate.

The outer peripheral protrusion 134 comes into engagement with the engaged portion 121 of the outer ring 120 to prevent relative rotation of the outer ring 120 and the cam cage ring 130.

The selector ring 140 is formed in an annular shape and includes a reduced diameter portion 141, a skirt portion 142 formed so as to extend in the axial direction from an outer peripheral edge of the reduced diameter portion 141, and an outer ring side selector 143 formed on an inner peripheral surface of the skirt portion 142 at predetermined intervals so as to protrude radially inwardly, wherein the outer ring side selector 143 is provided with an outer ring side cam abutment portion 144 that presses a lateral abutment surface 155 which will be described later.

The cam mechanism 150 includes, between the inner ring 110 and the outer ring 120, a plurality of cams 151 for transmitting a driving force and a biasing member 152 for biasing the plurality of cams 151 inward in a radial direction of the cam clutch 100.

A cam 151 includes the inner ring abutment curved surface 153 capable of coming into abutment with the inner ring side abutment portion 111 of the inner ring 110, the outer ring abutment curved surface 154 formed on the opposite side of the inner ring abutment curved surface 153 and capable of coming into abutment with the outer ring side abutment portion 122 of the outer ring 120, the lateral abutment surface 155 connected to one end of the outer ring abutment curved surface 154, a tilt adjustment receiving portion 157 that is formed so as to sandwich the outer ring abutment curved surface 154 with the lateral abutment surface 155 and notch the cam 151 from the opposite side, and a biased slit 158 notching the cam 151 so as to open the outer ring abutment curved surface 154 side.

In the present embodiment, the plurality of cams 151 are all arranged in the same orientation in the circumferential direction. However, by arranging the plurality of cams 151 in the circumferential direction in such a manner that the front and back sides thereof are reversed alternately, the postures of both the front and back cams 151 can be controlled by the common outer ring side selector 143, and complication and enlargement of the structure of the cam clutch 100 can be avoided.

In addition, the postures of both the front and back cams 151 can be controlled simultaneously.

The lateral abutment surface 155 is formed inside of a virtual extension curved surface S1 formed by extending the outer ring abutment curved surface 154 from a connecting point 156.

Next, a procedure of tilting the cams 151 of the cam clutch 100 according to one embodiment of the present invention will be described with reference to FIGS. 8 to 10.

Figure 8:
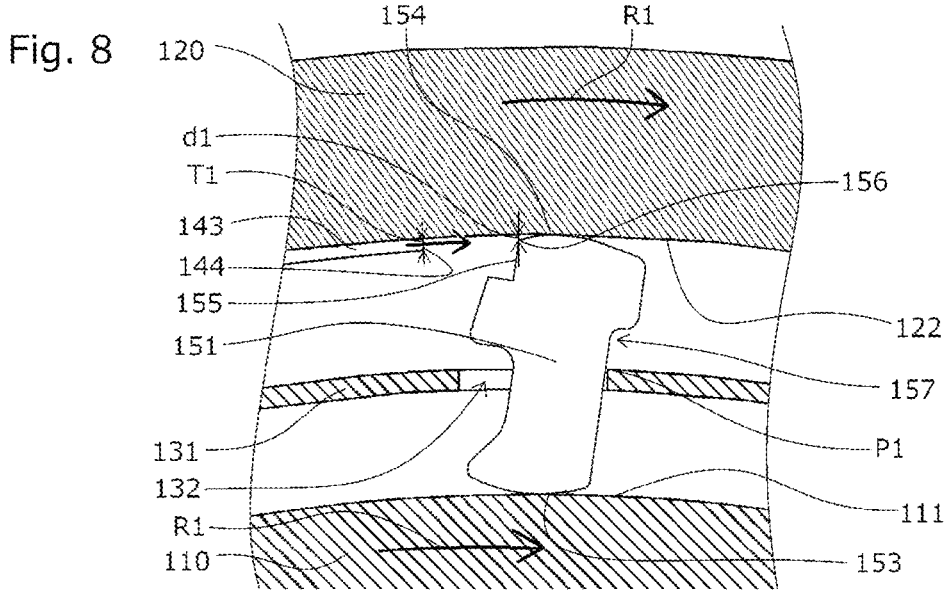
FIG. 8 is a front cross-sectional view showing a tilting operation 1 of the cam 151 of the cam clutch 100 according to an embodiment of the present invention.
Figure 9:
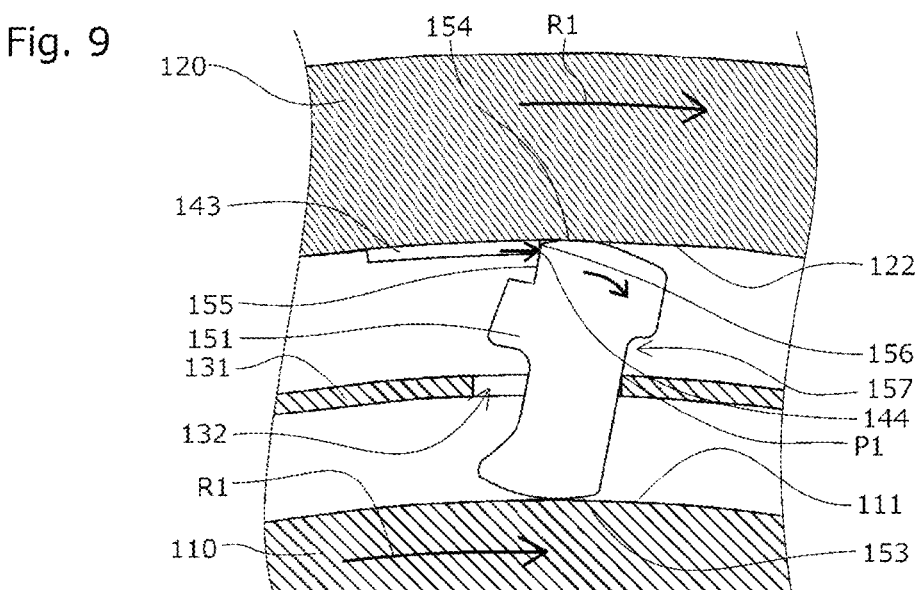
FIG. 9 is a front cross-sectional view showing a tilting operation 2 of the cam 151 of the cam clutch 100 according to an embodiment of the present invention.
Figure 10:
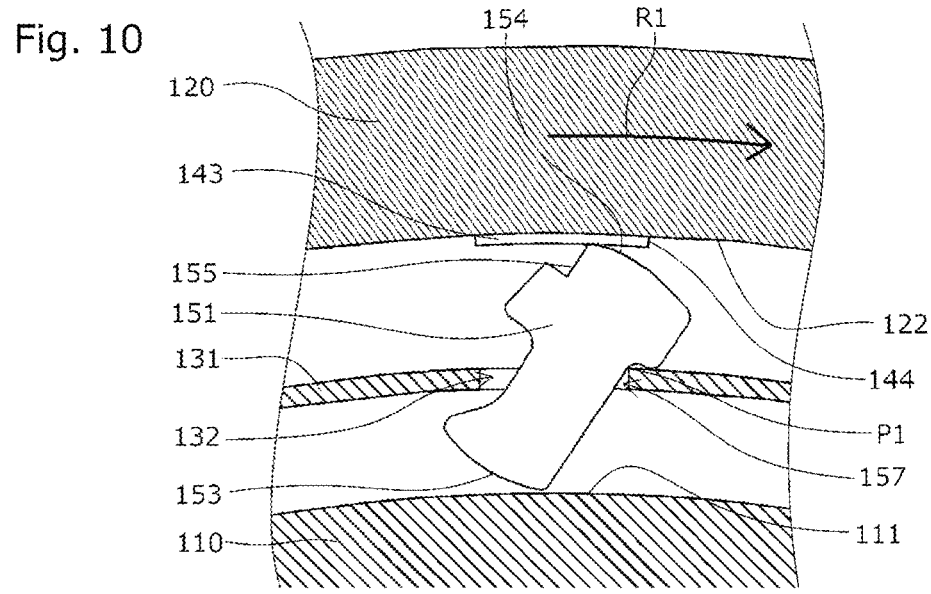
FIG. 10 is a front cross-sectional view showing a tilting operation 3 of the cam 151 of the cam clutch 100 according to an embodiment of the present invention.

For the sake of explanation, FIGS. 8 to 10 do not show the biasing member 152.

The cam clutch 100 according to one embodiment of the present invention is capable of switching between a free state in which the relative rotational operations of the inner ring 110 and the outer ring 120 are permitted by the posture of a cam 151, and a locked state in which the relative rotational operations of the inner ring 110 and the outer ring 120 are prohibited.

As shown in FIG. 8, the cam 151 biased by the biasing member 152 (not shown) is in a state where the inner ring abutment curved surface 153 is in frictional engagement with the inner ring side abutment portion 111 of the inner ring 110 and the outer ring abutment curved surface 154 is in frictional engagement with the outer ring side abutment portion 122 of the outer ring 120, and in a first locked state where rotation of the inner ring 110 in an R1 direction can be transmitted to the outer ring 120.

In this first locked state, by rotating the selector ring 140 in the same direction as the R1 direction, the outer ring side selector 143 gradually approaches the cam 151, and the outer ring side cam abutment portion 144 of the outer ring side selector 143 comes into contact with the lateral abutment surface 155 of the cam 151, as shown in FIG. 9.

At this time, if the positional relationship is such that a distance d1 from the connecting point 156 to the outer ring side abutment portion 122 is equal to or less than a radial thickness T1 of the outer ring side cam abutment portion 144 of the outer ring side selector 143, the outer ring side cam abutment portion 144 is not strongly sandwiched by the outer ring 120 and the outer ring abutment curved surface 154 by entering therebetween, and the outer ring side cam abutment portion 144 can easily tilt the cam 151 by transmitting a pressing force, which is a force for tilting the cam 151 reliably and efficiently, to the lateral abutment surface 155.

Further, the outer ring side selector 143 and the cam 151 themselves are not deformed.

Note that, for example, even if the outer ring side selector is arranged at a position where the radial distance to the outer ring side abutment portion is equal to or greater than d1 by using a pin-shaped outer ring side selector, the outer ring side selector is not strongly sandwiched by the outer ring and the outer ring abutment curved surface by entering therebetween, and the outer ring side selector can easily tilt the cam by transmitting the pressing force, which is a force for tilting the cam reliably and efficiently, to the lateral abutment surface.

The cam 151 starts to tilt the lateral abutment surface 155 in a direction where it is pressed by the outer ring side cam abutment portion 144. When the inner ring abutment curved surface 153 and the outer ring abutment curved surface 154 release frictional engagement with the inner ring side abutment portion 111 and the outer ring side abutment portion 122, respectively, the rotation of the inner ring 110 in the R1 direction is no longer transmitted to the outer ring 120, obtaining the free state.

The cam 151 accepts the body 131 of the cam cage ring 130 in the tilt adjustment receiving portion 157 to stabilize the position of the cam 151 with a tilt contact point P1 as a reference point.

Thus, the amount of movement for sufficiently tilting the cam 151 by the outer ring side cam abutment portion 144 can be secured, and when the tilting of the cam 151 by the outer ring side cam abutment portion 144 is released, the cam 151 can be automatically returned to the first locked state by the biasing force of the biasing member 152 (not shown).

Also, by adjusting the range of formation of the tilt adjustment receiving portion 157, if the shortest distance between the cam 151 and the outer ring side abutment portion 122 is equal to or greater than the thickness T1 in the radial direction of the outer ring side cam abutment portion 144 when the cam 151 is tilted, the outer ring side selector 143 can move to cross over the cam 151.

Thus, it is not necessary to reverse the movement direction of the outer ring side selector 143 when releasing the tilting of the cam 151, and the tilting of the cam 151 can be controlled only by the movement of the outer ring side selector 143 in one direction, thereby simplifying the device configuration.

Next, a procedure of tilting a cam 251 of a cam clutch 200 of another embodiment of the present invention using a selector ring 240 having an inner ring side selector 243 and the cam 251 will be described with reference to FIGS. 11 to 17.

Note that the descriptions of the configuration common to the cam clutch 100 using the outer ring side selector 143 and the cam 151 are omitted.

Figure 15:
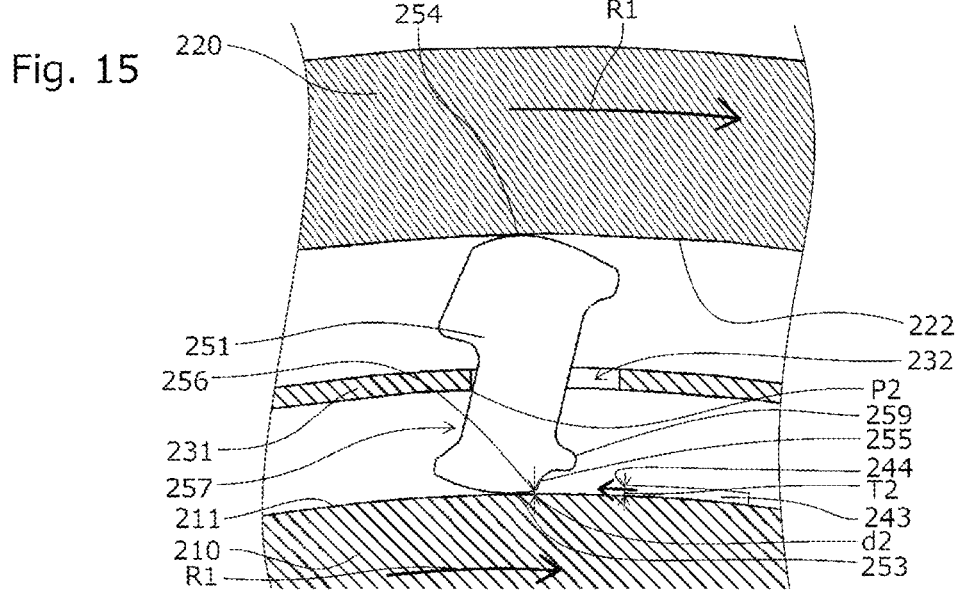
FIG. 15 is a front cross-sectional view showing a tilting operation 1 of the cam 251 of the cam clutch 200 according to an embodiment of the present invention.
Figure 16:
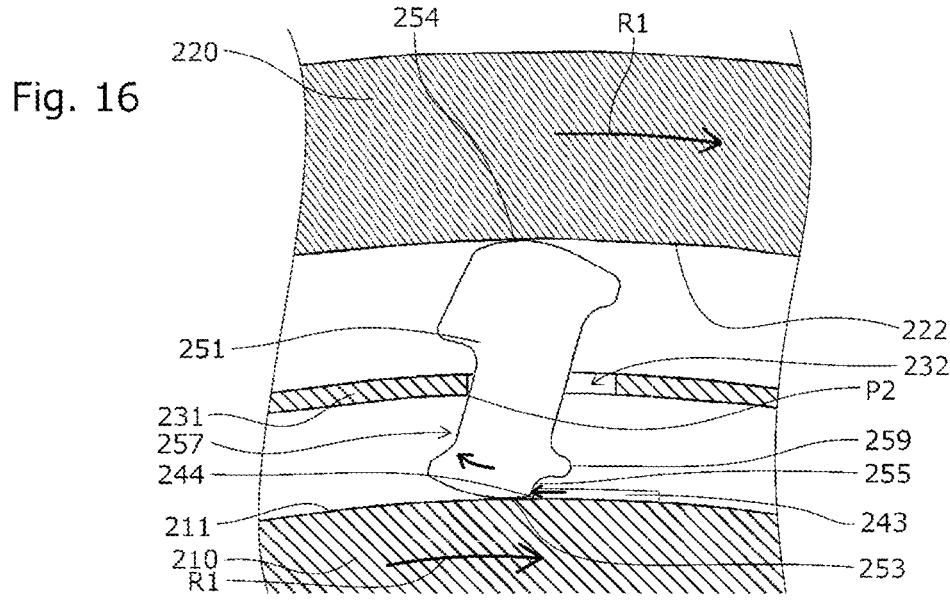
FIG. 16 is a front cross-sectional view showing a tilting operation 2 of the cam 251 of the cam clutch 200 according to an embodiment of the present invention.
Figure 17:
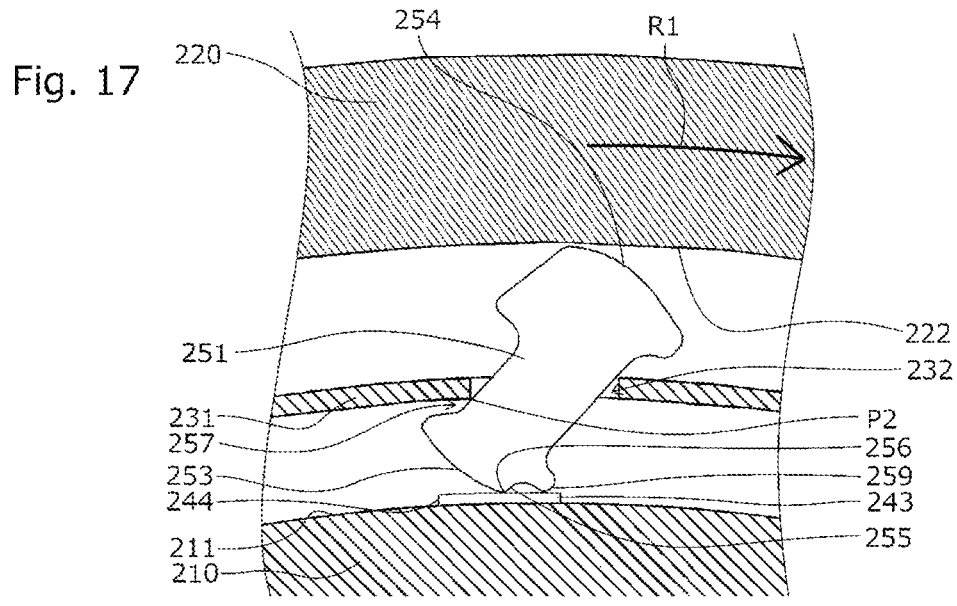
FIG. 17 is a front cross-sectional view showing a tilting operation 3 of the cam 251 of the cam clutch 200 according to an embodiment of the present invention.

For the sake of explanation, FIGS. 15 to 17 do not show a biasing member 252.

Figure 11:
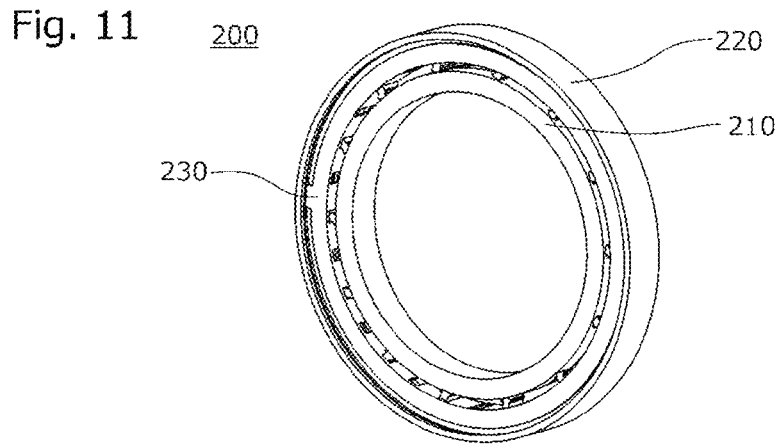
FIG. 11 is a perspective view of a cam clutch 200 according to an embodiment of the present invention.
Figure 12:
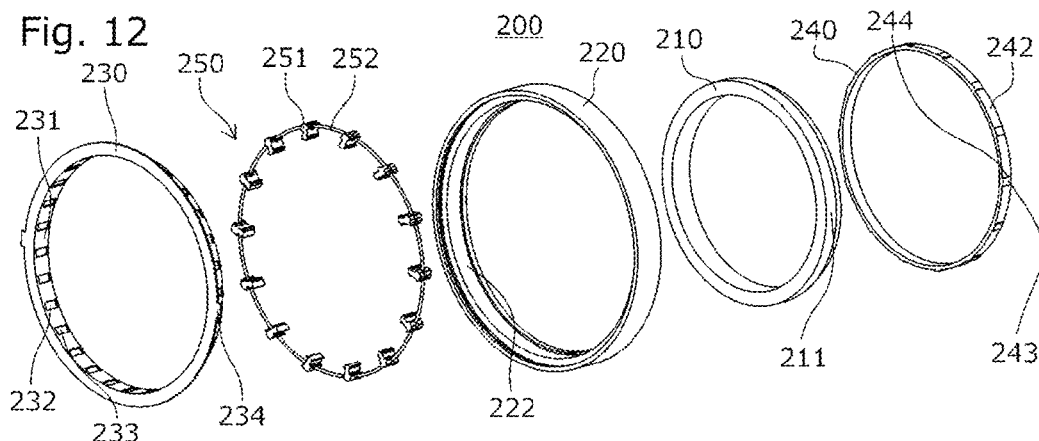
FIG. 12 is an exploded perspective view of the cam clutch 200 according to an embodiment of the present invention.

As shown in FIGS. 11 and 12, the selector ring 240 includes an annular skirt portion 242 and an inner ring side selector 243 formed on an outer peripheral surface of the skirt portion 242 at predetermined intervals so as to protrude radially outwardly, wherein the inner ring side selector 243 is provided with an inner ring side cam abutment portion 244 that presses a lateral abutment surface 255 which will be described later.

Figure 13:
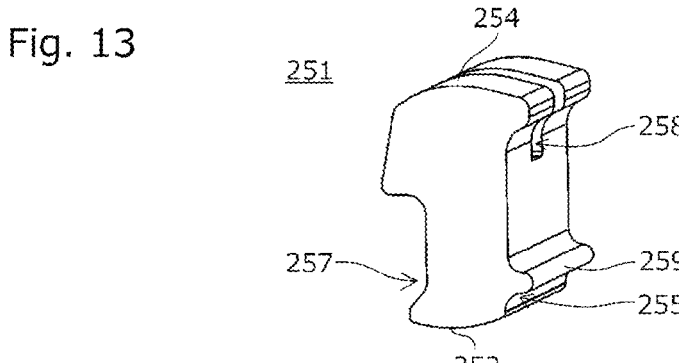
FIG. 13 is a perspective view showing a cam 251 of the cam clutch 200 according to an embodiment of the present invention.
Figure 14:
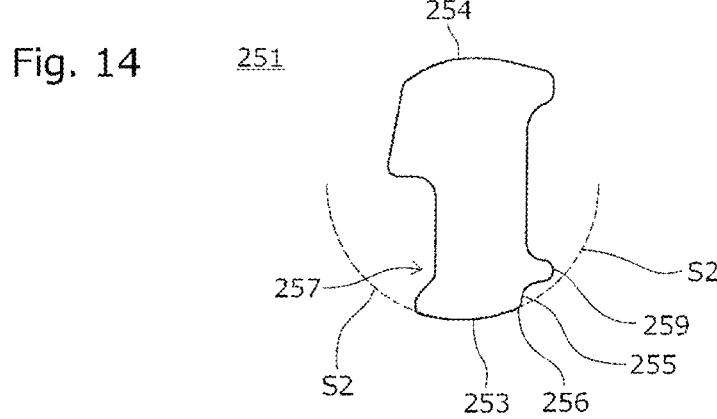
FIG. 14 is a front view showing the cam 251 of the cam clutch 200 according to an embodiment of the present invention.

As shown in FIGS. 13 and 14, a cam mechanism 250 includes, between the inner ring 210 and the outer ring 220, a plurality of cams 251 for transmitting a driving force and a biasing member 252 (not shown) for biasing the plurality of cams 251 inwardly in a radial direction of the cam clutch 200.

The cam 251 includes an inner ring abutment curved surface 253 capable of coming into abutment with an inner ring side abutment portion 211 of the inner ring 210, an outer ring abutment curved surface 254 formed on the opposite side of the inner ring abutment curved surface 253 and capable of coming into abutment with an outer ring side abutment portion 222 of the outer ring 220, the lateral abutment surface 255 connected to one end of the inner ring abutment curved surface 253, a tilt adjustment receiving portion 257 that is formed so as to sandwich the inner ring abutment curved surface 253 with the lateral abutment surface 255 and notch the cam 251 from the opposite side, a biased slit 258 notching the cam 251 so as to open the outer ring abutment curved surface 254 side, and a tilt adjustment protrusion 259 formed so as to protrude from the opposite side of a connecting point 256, with the lateral abutment surface 255 sandwiched therebetween.

In the present embodiment, the plurality of cams 251 are all arranged in the same orientation in the circumferential direction. However, by arranging the plurality of cams 251 in the circumferential direction in such a manner that the front and back sides thereof are reversed alternately, the postures of both the front and back cams 251 can be controlled by the common inner ring side selector 243, and complication and enlargement of the structure of the cam clutch 200 can be avoided.

In addition, the postures of both the front and back cams 251 can be controlled simultaneously.

The cam clutch 200 according to another embodiment of the present invention is capable of switching between a free state in which the relative rotational operations of the inner ring 210 and the outer ring 220 are permitted by the posture of a cam 251, and a locked state in which the relative rotational operations of the inner ring 210 and the outer ring 220 are prohibited.

As shown in FIG. 15, the cam 251 biased by the biasing member 252 is in a state where the inner ring abutment curved surface 253 is in frictional engagement with the inner ring side abutment portion 211 of the inner ring 210 and the outer ring abutment curved surface 254 is in frictional engagement with the outer ring side abutment portion 222 of the outer ring 220, and in a second locked state where rotation of the outer ring 220 in the R1 direction can be transmitted to the inner ring 210.

In this second locked state, by rotating the selector ring 240 in the direction opposite to the R1 direction, the inner ring side selector 243 gradually approaches the cam 251, and the inner ring side cam abutment portion 244 comes into abutment with the lateral abutment surface 255 of the cam 251, as shown in FIG. 16.

At this time, if the positional relationship is such that a distance d2 from the connecting point 256 to the inner ring side abutment portion 211 is equal to or less than a radial thickness T2 of the inner ring side cam abutment portion 244 of the inner ring side selector 243, the inner ring side cam abutment portion 244 is not strongly sandwiched by the inner ring 210 and the inner ring abutment curved surface 253 entering therebetween, and the inner ring side cam abutment portion 244 can easily tilt the cam 251 by transmitting a pressing force, which is a force for tilting the cam 251 reliably and efficiently, to the lateral abutment surface 255.

Further, the inner ring side selector 243 and the cam 251 themselves are not deformed.

Note that, for example, even if the inner ring side selector is arranged at a position where the radial distance to the inner ring side abutment portion is equal to or greater than d2 by using a pin-shaped inner ring side selector, the inner ring side selector is not strongly sandwiched by the inner ring and the inner ring abutment curved surface by entering therebetween, and the inner ring side selector can easily tilt the cam by transmitting the pressing force, which is a force for tilting the cam reliably and efficiently, to the lateral abutment surface.

The cam 251 starts to tilt the lateral abutment surface 255 in a direction where it is pressed by the inner ring side cam abutment portion 244. When the inner ring abutment curved surface 253 and the outer ring abutment curved surface 254 release frictional engagement with the inner ring side abutment portion 211 and the outer ring side abutment portion 222, respectively, the rotation of the outer ring 220 in the R1 direction is no longer transmitted to the inner ring 210, obtaining the free state.

The cam 251 accepts the body 231 of the cam cage ring 230 in the tilt adjustment receiving portion 257 to stabilize the position of the cam 251 with a tilt contact point P2 as a reference point.

Thus, the amount of movement for sufficiently tilting the cam 251 by the inner ring side cam abutment portion 244 can be secured, and when the tilting of the cam 251 by the inner ring side cam abutment portion 244 is released, the cam 251 can be automatically returned to the second locked state by the biasing force of the biasing member 252 (not shown).

Also, by adjusting the range of formation of the tilt adjustment receiving portion 257, if the shortest distance between the cam 251 and the inner ring side abutment portion 211 is equal to or greater than the thickness T2 in the radial direction of the inner ring side cam abutment portion 244 when the cam 251 is tilted, the inner ring side selector 243 can move to cross over the cam 251.

Thus, it is not necessary to reverse the movement direction of the inner ring side selector 243 when releasing the tilting of the cam 251, and the tilting of the cam 251 can be controlled only by the movement of the inner ring side selector 243 in one direction, thereby simplifying the device configuration.

Furthermore, since the cam 251 has the tilt adjustment protrusion 259, when the inner ring side selector 243 passes between the cam 251 and the inner ring 210, the cam 251 can be kept in a posture in which the cam 251 is easily returned to the second locked state in a cam housing portion 232 by contacting a surface of the inner ring side selector 243 at two points, i.e., the connecting point 256 and the tilt adjustment protrusion 259.

In addition, by adjusting the formation position and size of the tilt adjustment protrusion 259, the posture of the tilted cam 251 can be stabilized at a desired angle.

Although the embodiments of the present invention have been described in detail, the present invention is not limited to the above embodiments, and various design changes can be made without departing from the present invention described in the aspects.

Note that the above embodiments have described that the cam clutch 100 provided with the outer ring side selector 143 and the cam 151 having a lateral abutment surface connected to the outer ring abutment curved surface via a connecting point is a cam clutch different from the cam clutch 200 provided with the inner ring side selector 243 and the cam 251 having a lateral abutment surface connected to the inner ring abutment curved surface via a connecting point. However, the configuration of the cam clutch is not limited thereto, and for example, a cam clutch may be constructed by arranging cams alternately in the circumferential direction, the cams each having an outer ring side selector and an inner ring side selector and being tilted by the outer ring side selector and the inner ring side selector.

Also, the above embodiments have described that the outer ring side selector and the inner ring side selector are movable to the opposite side of the cam beyond the outer ring abutment curved surface and the inner ring abutment curved surface, respectively. However, the configuration of the cam clutch is not limited thereto, and for example, a configuration is possible in which the tilt angle of the cam is limited so that the outer ring side selector and the inner ring side selector do not cross over the outer ring abutment curved surface and the inner ring abutment curved surface, respectively.

Also, the above embodiments have described that the cam cage ring includes a ring body formed in an annular shape, cam housing portions and roller housing portions formed in the ring body so as to be alternately arranged over the entire circumference thereof, and an outer peripheral protrusion, wherein cams are housed in the cam housing portions and rollers are housed in the roller housing portions. However, the configuration of the cam clutch is not limited thereto, and for example, there may be no roller housing portions or rollers, a plurality of cam housing portions may be arranged continuously, and the same number of roller housing portions may be arranged at positions axially offset from the cam housing portions.

The above embodiments have also described that the biasing member biases the plurality of cams radially inwardly, but the configuration of the biasing member is not limited thereto, and for example, the same number of biasing members as the number of cams may be arranged to bias only the respective corresponding cams.

What is claimed is:

1. A cam clutch comprising:

an inner ring and an outer ring provided coaxially and relatively rotatably;

a plurality of cams provided in a circumferential direction between the inner ring and the outer ring;

biasing means that bias the plurality of cams in a radial direction; and an operation mode switching mechanism that switches between a free state in which relative rotational operations of the outer ring and the inner ring are permitted, and a locked state in which relative rotational operations of the outer ring and the inner ring are prohibited, wherein the operation mode switching mechanism includes a cam posture changing portion that is provided movably in a circumferential direction, a radial direction, or an axial direction independently of the rotational operations of the inner ring and the outer ring and forces each of the cams to tilt, the cam posture changing portion having a cam abutment portion capable of coming into contact with each of the cams from the circumferential direction, the plurality of cams each including an inner and outer ring abutment curved surface provided at a position facing an outer peripheral surface of the inner ring and/or an inner peripheral surface of the outer ring, and a lateral abutment surface provided at a position facing in a movement direction of the cam abutment portion, and the lateral abutment surface being connected to an end of the inner and outer ring abutment curved surface and formed inside of each of the cams relative to a virtual extension curved surface which is an extension of the inner and outer ring abutment curved surface.

2. The cam clutch according to claim 1, wherein the lateral abutment surface is formed by a plane orthogonal to the movement direction of the cam abutment portion.

3. The cam clutch according to claim 1, wherein a distance from a connecting point between the lateral abutment surface and the inner and outer ring abutment curved surface to the inner ring or the outer ring is equal to or less than a radial thickness of the cam abutment portion of the cam posture changing portion when the cam clutch is assembled.

4. The cam clutch according to claim 1, further comprising a tilt adjustment receiving portion, which is a space provided inside of each of the cams relative to the virtual extension curved surface, on the opposite side of the lateral abutment surface with the outer ring abutment curved surface interposed therebetween.

5. The cam clutch according to claim 1, wherein each of the cams is provided with a tilt adjustment protrusion protruding from a side of the lateral abutment surface opposite to a connecting point between the outer ring abutment curved surface and the lateral abutment surface with the lateral abutment surface therebetween.

* * * * *